Feb. 6, 1945.   A. C. BRUNS   2,369,014
MULTIPLE CUTTER TURNER
Filed June 18, 1943   2 Sheets-Sheet 2
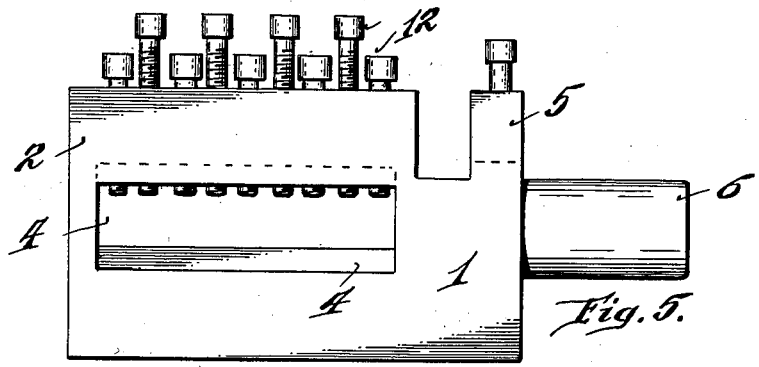
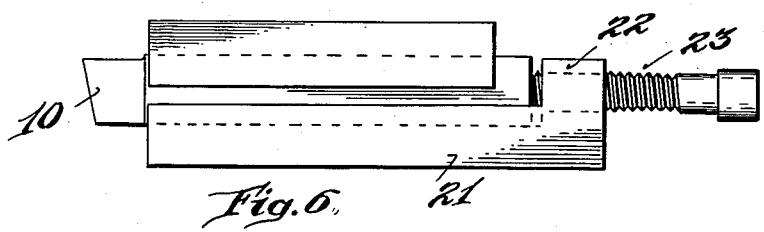
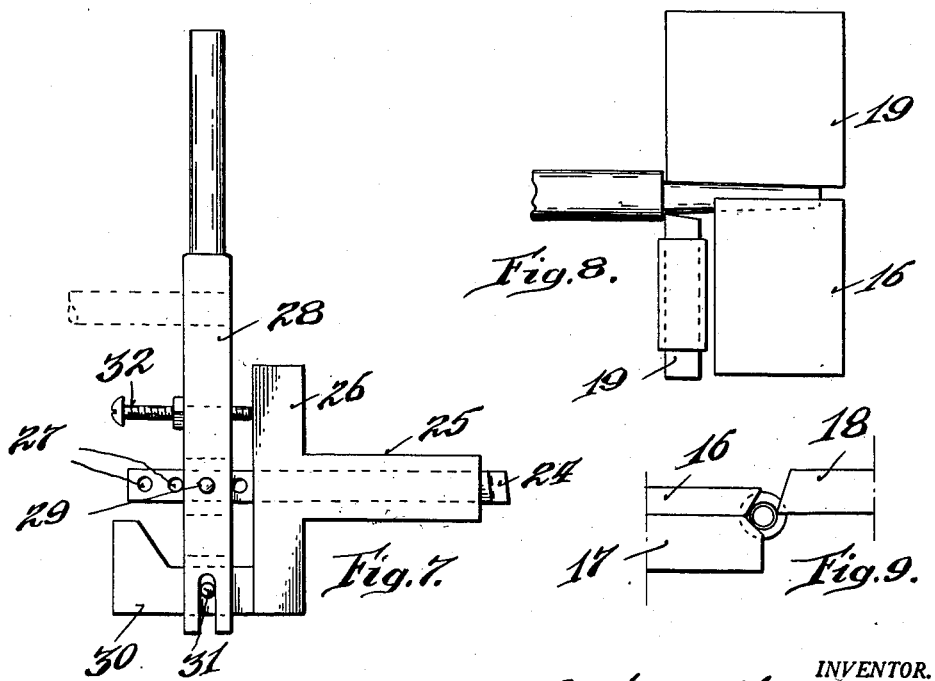
INVENTOR.
Anthony Charles Bruns
BY
Oliver B. Haisen
Atty.

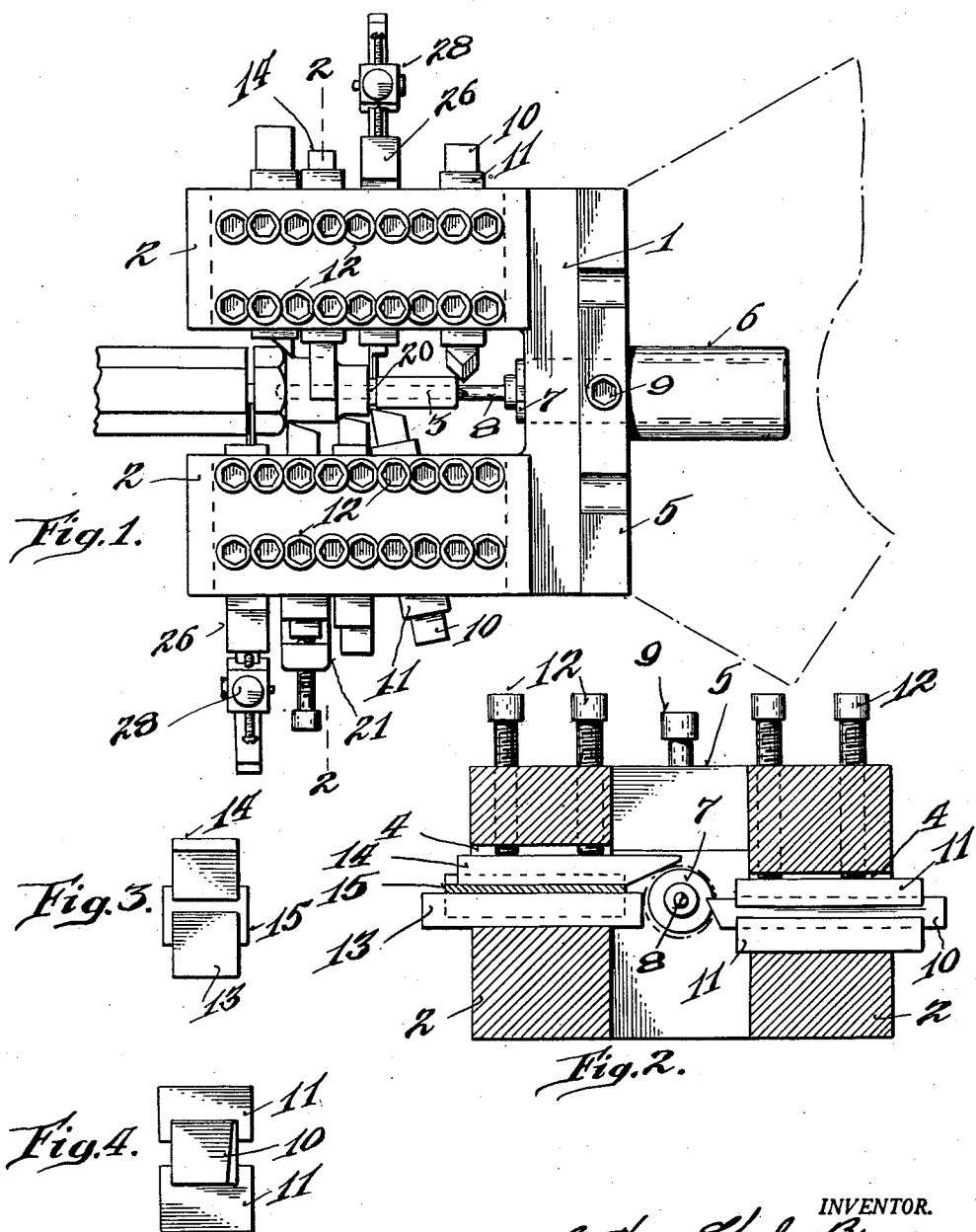

Patented Feb. 6, 1945

2,369,014

UNITED STATES PATENT OFFICE 2,369,014

MULTIPLE CUTTER TURNER

Anthony Charles Bruns, Cincinnati, Ohio

Application June 18, 1943, Serial No. 491,285

1 Claim. (Cl. 82—35)

This invention relates to improvements in a multiple or plural tool holder, applicable to metal turning machines, as a standard or turret lathe, for accurately simultaneously turning several diameters, center boring, chamfering, or other metal turning operations.

The tooling set-up provides for independent performance of tools having a transverse feeding motion during a non-feeding interval of the holder.

The tool holder provides for holding a plurality of cutters, work steady rests and other tool holding appliances at relative opposite sides of the work, with the work holding space between the tool supports clear for a free passage of the cuttings and liquid coolant with no opportunity for any collective accumulation requiring manual removal during a turning period.

An object of the invention is to provide a tool holder for application upon a machine tool, sustaining a plurality of diversified cutters or bits in a compact grouping and at relative opposite sides of the work, for simultaneous or independent operation upon the work to perform a multiplicity of turning or machining operations with a single setting of the tools and adapting the holder and the tools, as a unit, to be removed from the machine for preserving a tooling set-up.

Another object is to provide a tool holder, readily applicable to a metal turning machine or the like, of bifurcated form furnishing spaced parallel supports for positioning and grouping various tools at opposite sides of the work and the tools interchangeable from one support to the other.

Various other features and advantages will be more fully set forth and apparent from the description of the drawings accompanied herewith and forming a part hereof, illustrating a preferred embodiment of the invention, in which:

Figure 1 is a top plan view of the tool holder, as applicable to a turret of a turret lathe, and illustrating two groups of tools respectively arranged at opposite sides of the work; the work being, when turned, in finished form and partially cut from a bar stock.

Figure 2 is a section on line 2—2, Figure 1.

Figure 3 is a front end view of a pair of work steady rests and shoe.

Figure 4 is a front end view of a cutter or bit, and a pair of holding shoes therefor.

Figure 5 is a front or side elevation of the tool holder with the tools removed.

Figure 6 is a side elevation of a tool and shoes with micrometer adjustment.

Figure 7 is a side elevation of a tool holding fixture for independently holding and moving a cutter, the cutter moving transversely to the axis of the work adaptable for facing, necking or cutting the work from a bar stock.

Figure 8 is a top plan view of a set of tools for tapering the end of a rod or the like.

Figure 9 is an end view of the set of tools shown in Figure 8.

Referring to the drawings, 1 indicates a holder for sustaining a multiplicity or plurality of tools, respectively at opposite sides of the work, for performing various turning operations and cutting different diameters at one time. The holder is preferably of integral structure, for strength and sturdiness, and of bifurcated or U-form in plan, providing a pair of spaced parallel limbs or tool supports 2, 2, between which the work 3 is extended.

The limbs, each as a separate tool support, have an opening or passage 4 horizontally therethrough and longitudinally of the work for receiving and sustaining a plurality of tools in juxta arrangement. The tools extend through the passage for operating upon the work, and relatively set for cutting several different diameters or other work turning operations during the relative feeding advance of the tool holder and work, and for conjoint operation from relative opposite sides of the work. With the tools simultaneously effective, respectively from opposite sides of the work, there is a balancing of the cutting strain upon the work, avoiding work deflection, so that the machining can be to very close tolerances. It also provides for the simultaneous performance of several machining operations which could not be accomplished by any juxta-positioning of the tools on one side of the work, due to the tool width limitation.

The tool supports 2, 2, join with a body or head having a flange 5 on its upper side and slotted for transversing a pair of bolts for clamping the holder to a face side of a turret. The head of the holder has a tubular shank 6, projecting centrally therefrom for engagement into a bore or orifice in the turret, for additional anchorage to the turret and provide a stock for drill, holding arbor 7 holding a drill 8 for center drilling the work. The arbor is fixed within the stock of the holder by a set screw 9, accessible from the top side of the holder.

The tool receiving passages 4 of the supports are of corresponding dimension and preferably relatively offset, or at different elevations, to provide for interchangeability of the tools from one support to the other. For interchanging, in many instances, it is merely necessary to reverse the bit and its shoes to bring the cutting point or edge to an appropriate position with the center of the work, with the relief portion of the bit either above or below the work center depending upon the side of the work that the cutter bit is located and direction of work rotation.

The cutter bits 10, generally are formed from a conventional size of bar stock, square in cross section, as for example, from a ½" x ½" bar and engaged within a longitudinal channel in each of a pair of shoes 11, 11, and between which the bit is confined and clamped. The lower shoe is machined to give the proper setting of the bit to the work and ready for service when positioned and clamped within the holder. This provides a simple and inexpensive bit and bit mounting readily applicable within the tool holder. The cutter or bits generally are of a high speed steel or may constitute Stellite and carbide tipped cutters.

Each support 2, of the holder is provided with plural rows of tool clamping screws 12, all accessible from the top of the holder and with the adjoining screws in each row of relatively different length to disalign the heads thereof for a minimum spacing. The screws in each row may be in staggered arrangement to accommodate for an adequate clamping engagement with the tools of a group irrespective of the spacing or angular positions necessary for the tools to occupy for a given setting.

It is possible to remove any tool from either side of the holder for substitution or regrinding without disturbing the setting of the other tools of a group. The opposing arrangement of tools provides for cutting a shoulder with one tool and curving the edge with a second tool which dual performance could not be accomplished with the tools on one side as the proximity would prevent proper mounting.

It is also possible to apply work rests at either side of the work for appropriately opposing a cutter at an opposite side. The rests are comparative to a tool, and for a type as illustrated in Figures 2 and 3, comprise a pair of bars 13, 14, each gudingly engaged within a channel of a shoe 15, between the rest bars. The lower rest 13 abuttingly engages a side of the work, and the upper rest 14 has a bevelled or tapering end for a bearing contact on the top side of the work. The tips of the rest bars are suitably hardened to resist wear and furnish a proper bearing support against work deflection or vibration which would be detrimental to true and accurate machining. The rest may be either in single or compound assembly, and of any suitable width dimension to meet the needs. As illustrated in Figures 8 and 9, a pair of rests 16, 17, are assembled with their work engaging ends shaped to present a V for a plural point bearing contact against the work and accommodate for taper turning. The rest opposes an elongated single cutter 18 for turning the full length of taper, and adjoins a single cutter 19 for shoulder cutting at the inner end of the taper.

A tool set-up, as shown in Figure 1, provides, at the final feeding stage, for simultaneously performing five different turning operations together with center drilling of the work. Some of the tools are progressively effective, as toward the end of a feeding period, while other tools, having an independent transverse feeding motion are brought into action during a non-feeding interval, as for cutting an annular groove 20 into the work, termed necking, or cutting a finished piece of work from a bar stock.

When the cutting is performed on both sides, there is a balancing of the work, eliminating the use of guides. On work that must be held to very close tolerances, the cutters are placed both front and back to balance the cutting action as closely as possible, and preferably doing slightly more cutting with the front tool. With the opposed relation of the tools, it is possible to turn a shoulder as small as .001 of an inch, and when necessary for extremely accurate tool setting, the tool independently can be provided with a micrometric adjustment, as illustrated in Figure 6. In such instance, the lower shoe 21 at its forward end has an upwardly extending lug 22, carrying an adjusting screw 23 for engagement with the rear butt end of the cutter bit.

The use of a multiple or group of cutters on one side or both sides for turning the work with various diameters, is more economical over the method of providing a single configurated cutter. A single cutter shaped to produce the finished form of the work requires the services of a skilled mechanic to produce and to maintain it in an efficient working condition.

For necking, or work cutting off operation, which requires a feeding motion of the tool transverse to the axis of the work, a cutting tool or bit 24 is slidably mounted within a shank 25 of a fixture 26. The shank of the fixture is engaged through and clamped within the tool receiving passage 4 of one of the supports of the holder. The rear end of the bit extends beyond the body or head of the fixture, and is provided with a plurality of spaced apertures 27 for adjustably pivotally connecting the same to a hand lever 28 extending perpendicularly to the bit. The bit extends through an elongated aperture in the lever, and is pivotally connected therewith by a pin 29. The lower end of the hand lever is bifurcated to straddle a bracket 30, extending laterally from the lower end of the body of the fixture, and the lever is slidably and pivotally connected to the bracket by a pin 31 traversing the elongated slots in the limb ends of the lever.

The lever is provided with a stop screw 32 for limiting the feeding motion of the bit. The bracket 30 is of a form to limit the retreating movement of the lever and sustain the same in an erect position. The upper end of the lever has a removable hand-hold, adapted to be fixed in either a contiguous or angular position on the end of the lever.

As illustrated in Fig. 1, a plurality of tool fixtures, respectively as shown in Fig. 7, are included in the tool assembly of the holder. One for a necking operation, disposed in an intermediate position of the group of tools of one arm 2, for cutting an annular groove 20 into the work, and a second, as an end tool of the group in the opposite arm, for cutting the finished piece of work from the bar stock. In each instance, the shank 25, of the fixture is engaged through the passage or opening 4, of an arm 2 of the holder and securely clamped to the arm by a relative pair of set screws 12.

The holder is mounted upon the turret of a turret lathe, with the turret mounted upon a slide, which may be fed either manually or by power, and at an appropriate rate longitudinally of the work. The cutting tools on the holder with the advance of the slide are brought into cooperation with the work, the work rotating at a proper rate with the headstock of the lathe within which it is gripped following the common practice. The tool holder is adaptable to being mounted upon a carriage of a standard lathe, with the work gripped and rotated by the headstock brought centrally in the work space between the two supports of the holder.

Having described my invention, I claim:

A multiple tool holder, comprising: a body having a pair of spaced tool carrying supports integrally connected at one end, each removably sustaining tools for machining the work from opposite sides, the work rotatively supported and extending into the open spacing and intervening said supports, each support having a longitudinal passage therethrough for mounting a plurality of tools in juxta-position transversely therein, screws threaded through a wall of the support formed by said passage for clamping the tools within the support, in combination with a tool holding fixture having a shank for engagement through the passage of a support and clamped therein, a tool slidable longitudinally through the shank for moving the same transversely toward and from the work, a handle pivotally connecting with said tool for manually actuating the same and adjustable means for limiting the throw of the handle to control advance of the tool to the work.

ANTHONY CHARLES BRUNS.